United States Patent
Mullaney

(10) Patent No.: US 9,684,145 B2
(45) Date of Patent: Jun. 20, 2017

(54) DISTRIBUTED SPLIT CONFIGURATION FOR MULTI-DWELLING UNIT

(71) Applicant: Julian S. Mullaney, Raleigh, NC (US)

(72) Inventor: Julian S. Mullaney, Raleigh, NC (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 14/648,811

(22) PCT Filed: Nov. 26, 2013

(86) PCT No.: PCT/US2013/072013
§ 371 (c)(1),
(2) Date: Jun. 1, 2015

(87) PCT Pub. No.: WO2014/085459
PCT Pub. Date: Jun. 5, 2014

(65) Prior Publication Data
US 2015/0301301 A1 Oct. 22, 2015

Related U.S. Application Data

(60) Provisional application No. 61/731,862, filed on Nov. 30, 2012.

(51) Int. Cl.
*G02B 6/44* (2006.01)
*G02B 6/46* (2006.01)
*G02B 6/42* (2006.01)

(52) U.S. Cl.
CPC ............ *G02B 6/46* (2013.01); *G02B 6/4285* (2013.01); *G02B 6/4466* (2013.01); *G02B 6/4471* (2013.01); *G02B 6/4475* (2013.01)

(58) Field of Classification Search
None
See application file for complete search history.

(56) References Cited

U.S. PATENT DOCUMENTS

| | | | |
|---|---|---|---|
| 5,212,752 A | 5/1993 | Stephenson et al. |
| 5,748,819 A | 5/1998 | Szentesi et al. |
| 5,809,192 A | 9/1998 | Manning et al. |
| 6,296,399 B1 | 10/2001 | Halbach et al. |

(Continued)

FOREIGN PATENT DOCUMENTS

| | | |
|---|---|---|
| EP | 2 128 675 A1 | 12/2009 |
| JP | 2004-070248 | 3/2004 |

(Continued)

OTHER PUBLICATIONS

International Search Report and Written Opinion for International Application No. PCT/US2013/072013 mailed Mar. 14, 2014 (12 pages).

*Primary Examiner* — Sung Pak
(74) *Attorney, Agent, or Firm* — Merchant & Gould P.C.

(57) ABSTRACT

Installing a fiber distribution system in a building having multiple floors includes routing a feed fiber to a first enclosure located at one of the floors of the building; disposing pre-connectorized ends of distribution fibers within the first enclosure; routing optical ferrules, which terminate second ends of the distribution fibers without connector bodies, through the building via a sheath; accessing the optical ferrules of the distribution fibers at respective floors; attaching connector bodies around the optical ferrules; and disposing the connector bodies within fiber distribution terminals at the appropriate floors.

14 Claims, 17 Drawing Sheets

(56) References Cited

U.S. PATENT DOCUMENTS

| | | |
|---|---|---|
| 6,341,188 B1 | 1/2002 | Serrander et al. |
| 6,614,962 B1 | 9/2003 | Serrander et al. |
| 6,695,489 B2 | 2/2004 | Nault |
| 7,147,384 B2 | 12/2006 | Hardcastle et al. |
| 7,204,016 B2 | 4/2007 | Roth et al. |
| 7,204,644 B2 | 4/2007 | Barnes et al. |
| 7,270,487 B2 | 9/2007 | Billman et al. |
| 7,322,421 B2 | 1/2008 | Blacklaw |
| 7,341,382 B2 | 3/2008 | Dye |
| 7,369,738 B2 | 5/2008 | Larson et al. |
| 7,614,799 B2 | 11/2009 | Bradley et al. |
| 7,785,017 B2 | 8/2010 | Barnes et al. |
| 8,292,517 B2 | 10/2012 | Allen et al. |
| 8,439,577 B2 | 5/2013 | Jenkins |
| 8,616,786 B2 | 12/2013 | Dahlfort et al. |
| 8,753,022 B2 | 6/2014 | Schroeder et al. |
| 9,091,832 B2 | 7/2015 | Griffiths et al. |
| 9,182,567 B2 | 11/2015 | Mullaney |
| 2004/0126069 A1 | 7/2004 | Jong et al. |
| 2007/0025665 A1 | 2/2007 | Dean, Jr. et al. |
| 2010/0014819 A1 | 1/2010 | Herbst |
| 2011/0158597 A1 | 6/2011 | Bell |
| 2012/0093473 A1 | 4/2012 | Cox et al. |

FOREIGN PATENT DOCUMENTS

| | | |
|---|---|---|
| WO | WO 02/05310 | 1/2002 |
| WO | WO 2008/091720 | 7/2008 |
| WO | WO 2012/037727 A1 | 3/2012 |
| WO | WO 2015/114480 A1 | 8/2015 |
| WO | WO 2015/121778 A1 | 8/2015 |
| WO | WO 2015/121791 A2 | 8/2015 |
| WO | WO 2015/198190 A1 | 12/2015 |
| WO | WO 2016/005879 A1 | 1/2016 |

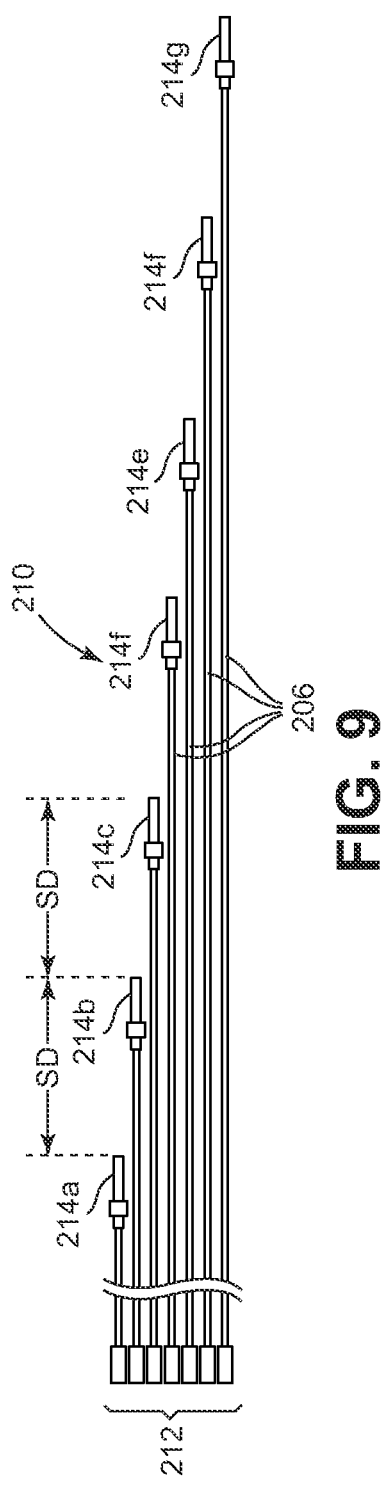
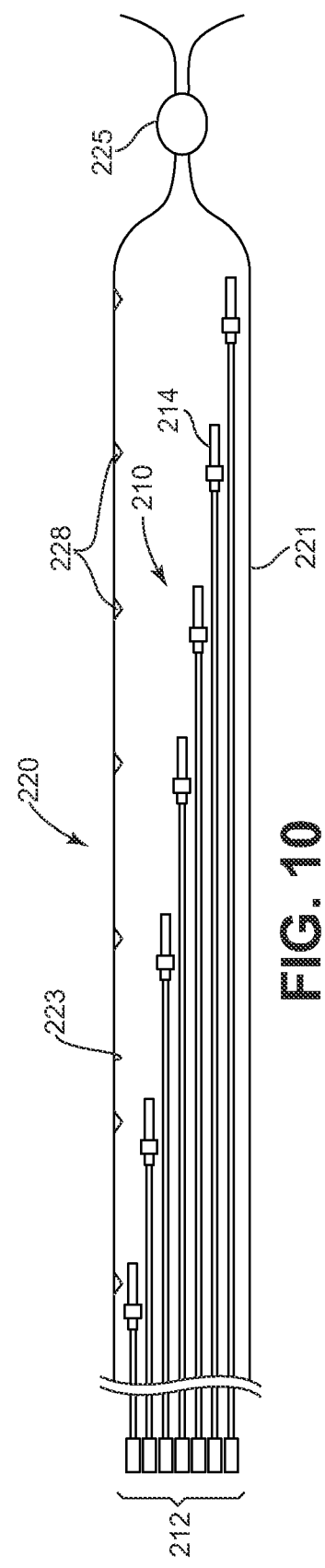

DISTRIBUTED SPLIT CONFIGURATION FOR MULTI-DWELLING UNIT

This application is a National Stage of PCT International Patent application No. PCT/US2013/072013, filed 26 Nov. 2013, which claims priority to U.S. Patent Application Ser. No. 61/731,862 filed on 30 Nov. 2012, the disclosures of which are incorporated herein by reference in their entireties. To the extent appropriate, a claim of priority is made to each of the above disclosed applications.

BACKGROUND

As demand for telecommunications increases, fiber optic networks are being extended in more and more areas. In facilities such as multiple dwelling units (MDU's), apartments, condominiums, businesses, etc., fiber optic distribution terminals are used to provide subscriber access points to the fiber optic network. Fiber optic distribution terminals are often installed at separate floors of an MDU and are connected to the fiber optic network through cables connected to a network hub. Cables are also used to interconnect the subscriber access points provided by the fiber distribution terminals with subscriber interface units (e.g., Optical Network Terminals) provided at subscriber locations (e.g., at each residence of an MDU). With respect to such fiber distribution systems, there is a constant demand for systems having reduced cost and installation times.

SUMMARY

In accordance with aspects of the disclosure, a fiber distribution system for a building includes a bundle or group of optical fibers; a first enclosure disposed at a first location within the building; and a first distribution terminal disposed at a second location within the building that is remote from the first enclosure. Each of the optical fibers in the bundle has a different length so that the optical ferrules are staggered from each other along an axial length of the bundle. The first enclosure is configured to receive first ends of the optical fibers of the bundle and at least one feed fiber. The first distribution terminal is configured to receive second end of at least one of the optical fibers.

In an example, the second end of each optical fiber is held by an optical ferrule without a connector body. In an example, the first end of each optical fiber of the bundle is terminated by an optical connector. In an example, at least some of the optical connectors terminating the first ends of the optical fibers are managed by a connector holder disposed within the first enclosure.

Some example fiber distribution systems include a sheath body defining an interior that is accessible through an axial slit. The interior of the sheath body is sized to receive the bundle of optical fibers. In certain examples, the sheath body is reinforced to resist stretching along an axial length of the sheath body. In an example, the sheath body is formed from a mesh material including axially extending strength members. In an example, the axial slit is defined by overlapping axial edges of the sheath body. The sheath body can include a pulling loop at one end. In an example, the sheath body includes markings that indicate locations of the second ends (e.g., and the optical ferrules) of the optical fibers of the bundle.

Some example fiber distribution systems include a first splitter disposed in the first enclosure. The first splitter is configured to optically couple to the feed fiber and to the first ends of at least some of the optical fibers of the bundle. In an example, the first splitter defines an input port configured to receive a connectorized end of the feed fiber or pigtail coupled to the feed fiber; and the first splitter also defines at least one output port that is configured to receive the first end of one of the optical fibers of the bundle.

Some example fiber distribution systems include a second splitter disposed in the first distribution terminal. The second splitter is configured to optically couple to the second end of a first of the optical fibers of the bundle and to a first end of at least one patch cord. In an example, a connector body is mounted over the optical ferrule of the first optical fiber after deployment of the fiber bundle. In an example, the second splitter defines an input port configured to receive the connector body; and the second splitter also defines at least one output port that is configured to receive the first end of the at least one patch cord.

In accordance with other aspects of the disclosure, a method of installing a fiber distribution system in a building having multiple floors includes routing a feed fiber to a first enclosure located at one of the floors of the building; disposing pre-connectorized ends of distribution fibers within the first enclosure;

routing second ends of the distribution fibers through the building via a sheath assembly so that the sheath assembly extends along each floor; accessing the second ends of the distribution fibers at respective floors; attaching connector bodies at the second ends; and disposing the connector bodies within fiber distribution terminals at the floors. In certain implementations, the connector bodies are installed over optical ferrules, which hold the second ends of the distribution fibers. In other implementations, the connector bodies are installed over unterminated second ends of the distribution fibers.

Example method also can include incrementally connecting subscribers to the fiber distribution system. In an example, incrementally connecting subscribers includes mounting a first splitter within the first enclosure; optically coupling the feed fiber to the first splitter; optically coupling the pre-connectorized end of a first of the distribution fibers to the first splitter; mounting a second splitter within the fiber distribution terminal at one of the floors; optically coupling the connector body of the first distribution fiber to the second splitter; optically coupling a first end of a patch cord to the second splitter; and optically coupling a second end of the patch cord to an ONT located on the same floor as the fiber distribution terminal.

In an example, accessing the optical ferrules of the distribution fibers at the respective floors includes pulling back the sheath assembly; looping at least part of the sheath assembly within the fiber distribution terminals; and removing each optical ferrule and a slack length of the respective optical fiber from the sheath assembly at each floor.

In an example, optically coupling the second end of the patch cord to the ONT includes routing the second end of the patch cord from the fiber distribution terminal to the ONT; attaching a second connector body around the optical ferrule at the second end of the patch cord; and plugging the second connector body into the ONT. The second end is terminated by an optical ferrule without a connector body. In an example, optically coupling the first end of a patch cord to the second splitter includes inserting an optical connector terminating the first end of the patch cord into an output port of the second splitter.

In accordance with other aspects of the disclosure, a sheath assembly includes an elongated sheath body; and a plurality of optical fibers disposed within the interior of the sheath body. The sheath body defines an axial slit through which an interior of the sheath body can be accessed. Each of the optical fibers has one end that is free of a connector body. Each of the optical fibers has a different length so that the free ends are staggered along the axial direction of the sheath body.

In an example, the sheath body is reinforced to resist stretching in an axial direction. In certain examples, an optical ferrule is disposed at each free end. In an example, a distance between adjacent ones of the staggered optical ferrules is less than a distance between floors of a building in which the optical fibers are being installed. In an example, each of the optical fibers has a pre-connectorized end (e.g., an SC-type connector or an LC-type connector). In an example, the pre-connectorized ends of the optical fibers are stored at a connector holder.

In an example, the sheath body includes a mesh material and at least one axially extending strength member. In an example, the sheath body is marked to indicate a location of each optical ferrule. In an example, the axial slit is defined by overlapping axial edges of the sheath body. In an example, the sheath assembly is wound on a spool.

In accordance with other aspects of the disclosure, a system for manufacturing a sheath assembly includes a first spool holding an elongated length of a sheath body; a plurality of bobbins that each hold an optical fiber; an insertion tool including a plow section and defining a passageway; and a second spool on which the sheath body is wound while the optical fibers are inserted into the sheath body. The plow section of the insertion tool is configured to open an axial slit defined in the sheath body. The passageway is sized and shaped for grouping the optical fibers from the bobbins into a bundle and routing the bundle into the opened axial slit. Each optical fiber has a first end terminated by an optical connector and a second end terminated by an optical ferrule without a connector body. At least one of the optical fibers has a different length from another of the optical fibers. In an example, each of the optical fibers has a different length than the other optical fibers.

In accordance with other aspects of the disclosure, a method for manufacturing a sheath assembly from an elongated of a sheath body and a plurality of optical fibers includes unwinding a length of the elongated sheath body; pulling pre-connectorized ends of optical fibers from a plurality of bobbins; routing the optical fibers through a passageway defined in an insertion tool; inserting the insertion tool within the sheath body and axially moving the sheath body relative to the insertion tool to spread open an axial slit defined in the sheath body; and winding the sheath assembly about a second spool. The optical fibers enter the sheath body through the axial slit as the sheath body slides along the insertion tool to form a sheath assembly. Each of the optical fibers has a different length so that second ends of the optical fibers are axially staggered from each other. Each of the second ends is terminated by an optical ferrule without a connector body.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 9 illustrates an example bundle of distribution fibers having different lengths in accordance with the principles of the present disclosure;

FIG. 10 shows the distribution fiber bundle of FIG. 9 disposed within a sheath assembly in accordance with the principles of the present disclosure;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
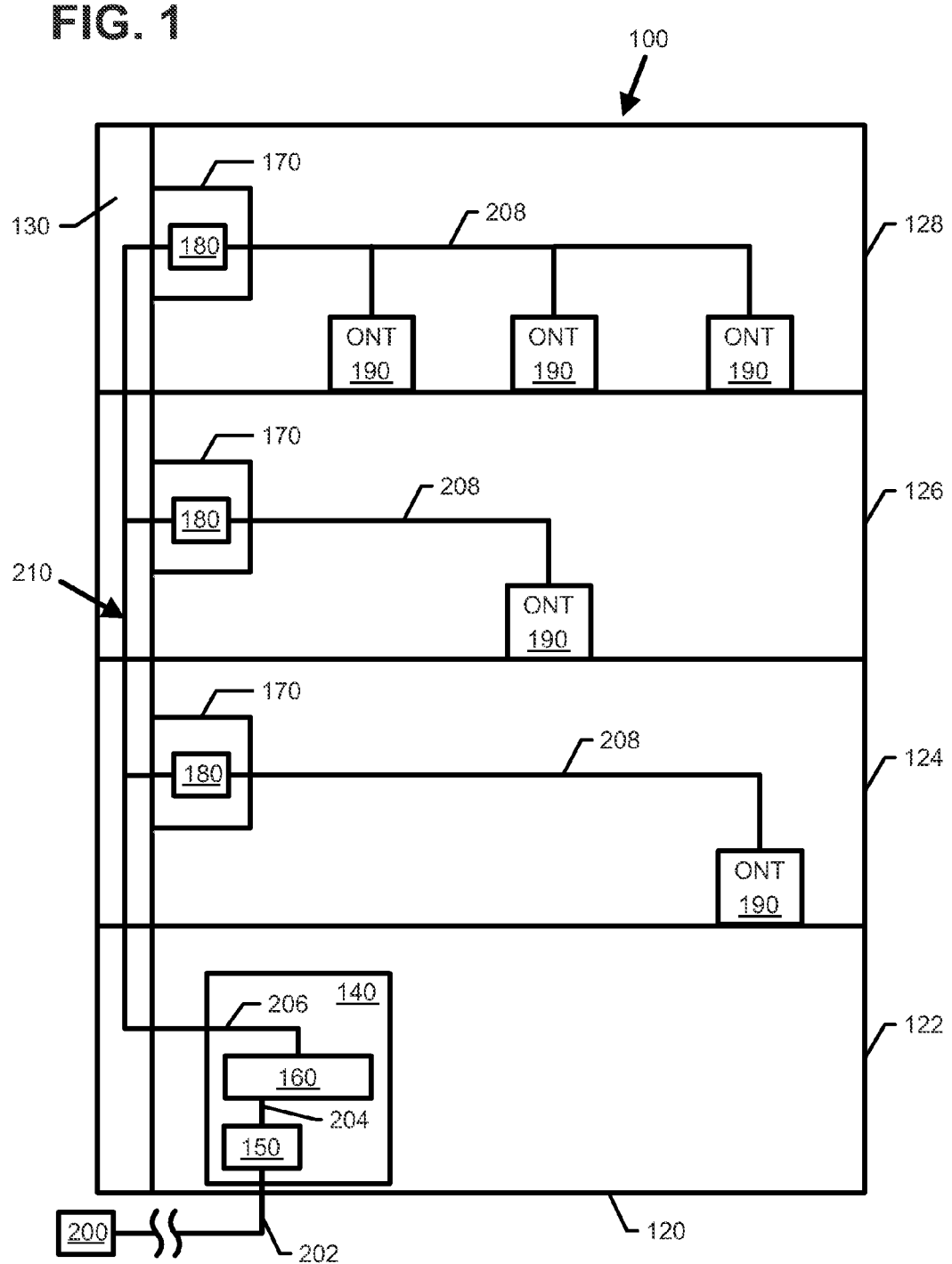
FIG. 1 is a schematic diagram showing an example fiber distribution system installed within an example building in accordance with the principles of the present disclosure.

Referring to FIG. 1, an example fiber optic distribution system 100 in accordance with the principles of the present disclosure is shown. The fiber optic distribution system 100 is shown incorporated into a building, such as a multi-dwelling unit (MDU) 120, having multiple floors 122, 124, 126 and 128 (i.e., multiple levels). The floor 122 can be a basement. A riser or other ductwork 130 can run between the various floors 122, 124, 126, 128. While depicted in an MDU 120, it will be appreciated that the fiber distribution system 100 can be used in other types buildings and other types of applications.

The fiber distribution system 100 is shown including a first enclosure 140 (e.g., a fiber distribution hub) installed at the floor 122 (e.g., typically in the basement or lowest floor of the building). The first enclosure 140 is shown receiving at least one feed fiber 202 routed from a service provider 200 (e.g., from a central office of a service provider). In some implementations, the feed fiber 202 is routed to a splice module 150 to couple the feed fiber 202 to a connectorized pigtail 204. In other implementations, the feed fiber 202 may have a connectorized end. In some examples, multiple feed fibers 202 are enclosed within a jacket to form a feed cable 201 routed to the first enclosure 140.

The first enclosure 140 can include a housing 141 that encloses one or more optical splitters 160. The optical splitter 160 can be configured to split optical signals supplied to the first enclosure 140 by the feed fiber 202. Outputs of the optical splitter 160 can be optically connected to optical fibers routed to the various floors 122, 124, 126, 128 of the building 120. The housing 141 can also enclose various structures for making optical connections between optical fibers of optical cables. For example, the housing 141 can include a plurality of fiber optic adapters for connecting fiber optic connectors, splice trays for protecting optical splices between optical fibers, connector holders for storing connectorized ends that are not in use, or other types of structures. In certain examples, splitters described herein can be optical power splitters, wavelength division multiplexers, or other types of splitters.

The fiber distribution system 100 is shown including fiber distribution terminals 170 at each of the upper floors 122, 124, 126, 128. Optical fibers 206 interconnect the first enclosure 140 and the fiber distribution terminals 170. For example, a bundle 210 of the optical fibers 206 may be routed up a riser 130 of the building 120 using a sheath assembly 220 as will be described in more detail herein. In other examples, the bundle 210 may be routed along another type of duct (e.g., a horizontal duct) within the building 120. The optical fibers 206 can be optically coupled to the feed fiber 202 through the optical splitter 160 in the first enclosure 140. In certain implementations, the optical fibers 206 can include a protective buffer layer/tube.

The fiber distribution terminals 170 can each contain one or more splitter modules 180 for splitting signals carried by the optical fibers 206. The optical splitters 180 at the fiber distribution terminals 170 can optically connect the optical fibers 206 to connectorized splitter pigtails or to adapter outputs. In one example, the optical splitters 180 can each provide a split ratio of at least 1 to 4. In another example, the optical splitters 180 can each provide a spit ratio of at least 1 to 8. In certain implementations, each fiber distribution terminal 170 includes a single splitter 180. In other implementations, multiple splitters 180 can be installed within the terminal 170. This type of example uses a distributed optical splitting strategy where optical splitting can occur at the first enclosure 140 and/or at each floor 122, 124, 126, 128.

In some implementations, the splitter 180 within each terminal 170 includes adapter inputs to receive connectorized ends of the optical fibers 206 and adapter outputs to receive first connectorized ends of patchcords 208. In other implementations, fiber optic adapters can be disposed within the fiber distribution terminals 170 to optically connect connectorized splitter pigtails to the patch cords 208. A second end of each patch cord 208 is routed horizontally along the floors 122, 124, 126, 128 from the fiber distribution terminals 170 to an optical network terminal (ONT) 190 or other type of interface device (e.g., an interface box, an interface panel, etc.) corresponding to one of the subscriber locations (e.g., an apartment, a residence, an office, a condominium, etc.) on each floor 122, 124, 126, 128. An ONT 190 is an active device that converts optical signals from the service provider to electrical signals used at the subscriber locations.

In other examples, multiple optical fibers 206 can be routed to each floor 122, 124, 126, 128. For such examples, the fiber distribution terminals 170 can include multiple splitters 180 that each receive one of the optical fibers 206. In certain examples, the multiple fibers 206 form a single cable routed to the floor. For such examples, the terminals 170 may contain fan-out devices (e.g., fan-out modules) that separate the optical fibers 206 into a plurality of connectorized pigtails that can be optically connected to the splitters. In still other examples, one or more of the connectorized pigtails may be coupled to a respective patch cord 208 via a termination adapter disposed within the terminal 170 to allow an unsplit connection between the first enclosure 140 and the ONT 190.

Figure 2:
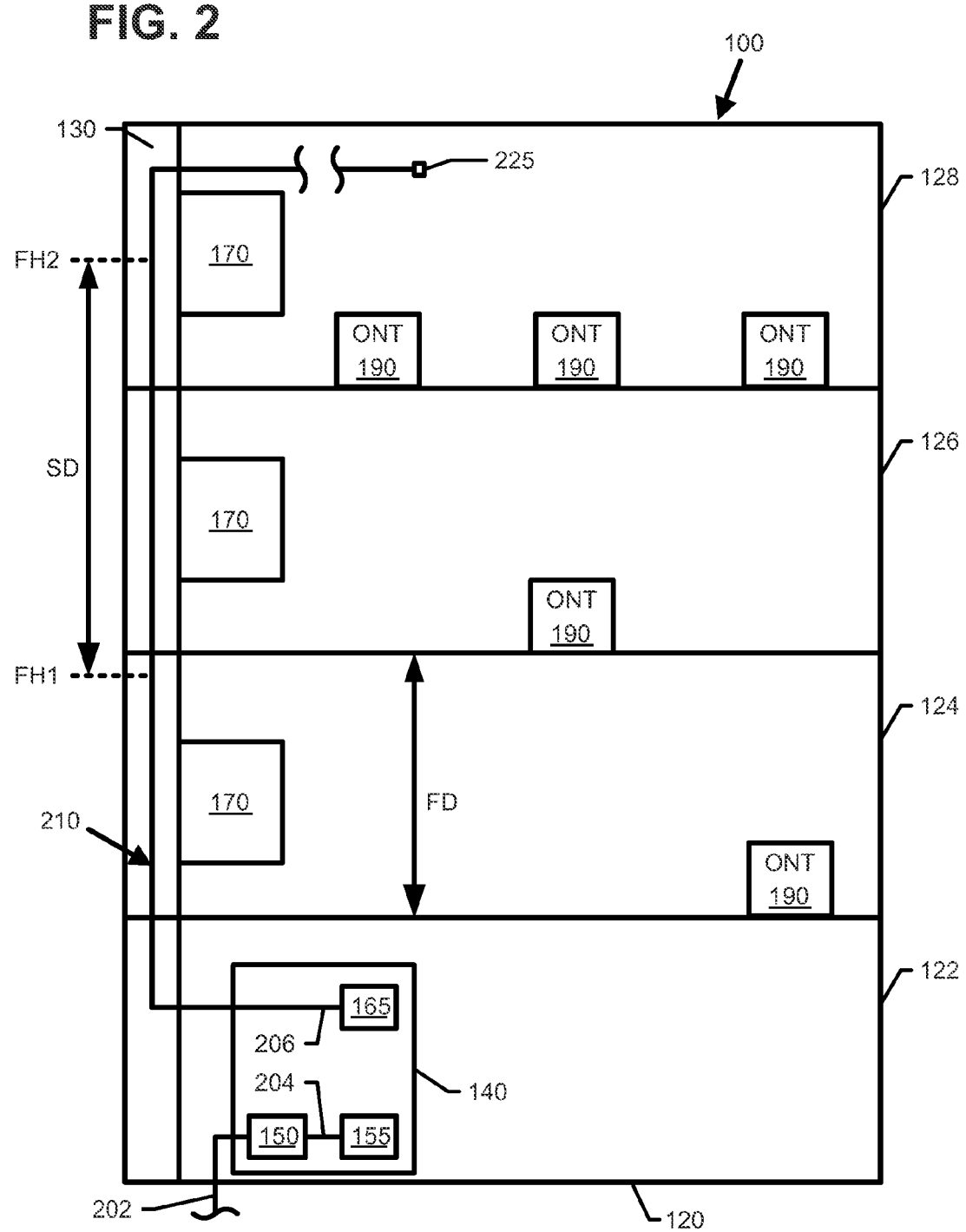
FIGS. 2-5 are schematic diagrams showing an installation process for the fiber distribution system of FIG. 1.

FIGS. 2-5 illustrate an example installation process for the fiber distribution system 100 within the building 120. In some implementations, the distribution terminals 130 can be mounted at the floors during the initial installation of the distribution system 100. In other implementations, a distribution terminal 130 can be installed at a floor 124, 126, 128 when service is desired on that floor. In FIG. 2, one or more feed fibers 202 are routed to the first enclosure 140 and directed to a splice module 150.

First ends of distribution fibers 206 also are disposed within the first enclosure 140. Second ends of the distribution fibers 206 are routed up a riser 130 in the building 120 (e.g., within a wall) to the top floor 128 or roof of the building 120. For example, the distribution fibers 206 can be unwound from a spool located in the basement or first floor 122 as the fibers 206 are routed through the riser 130. In other implementations, the second ends can be routed through other types of ducts or conduits to access points throughout the building 120.

Figure 6:
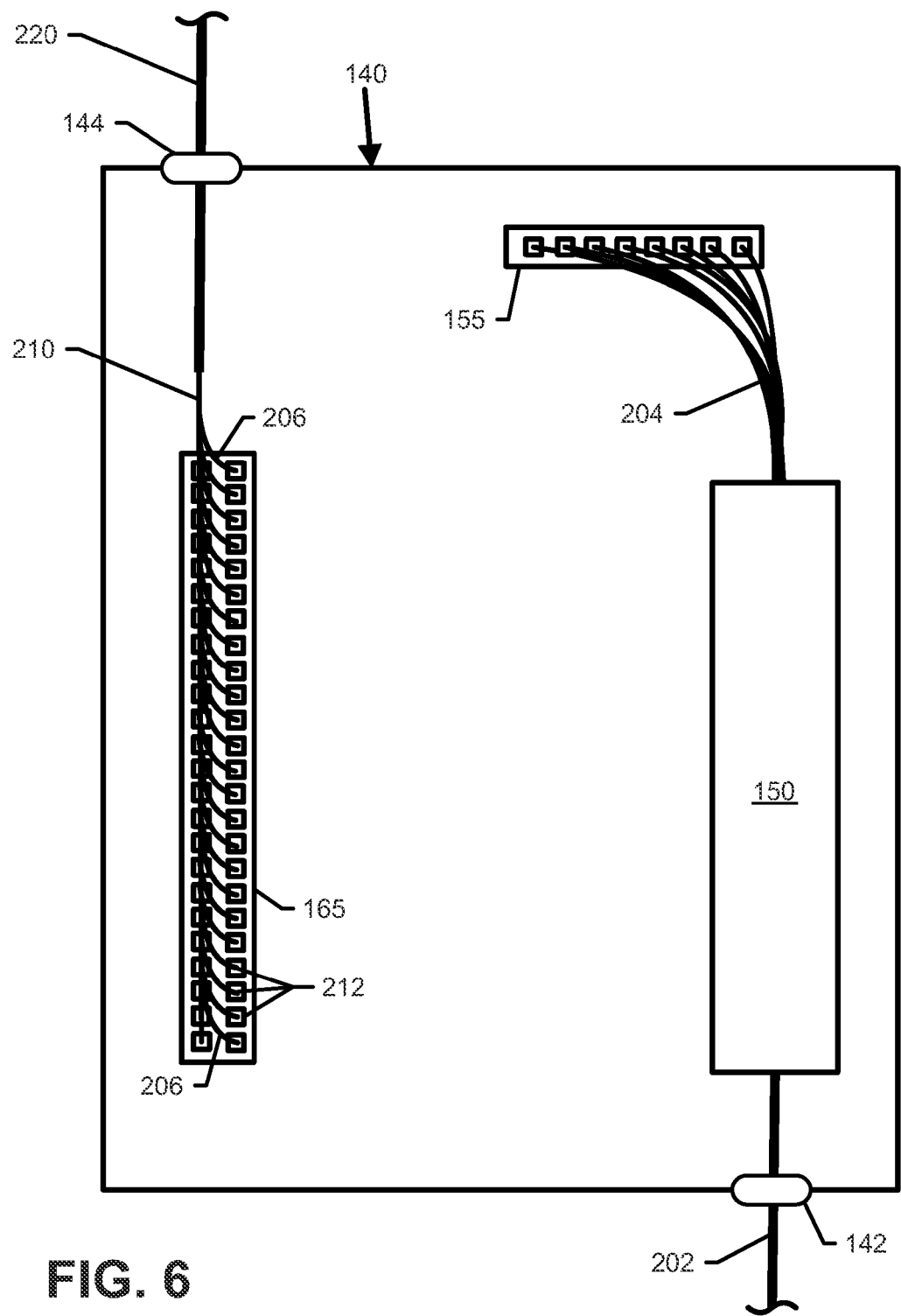
FIG. 6 is a schematic diagram of an example first enclosure suitable for use with the fiber distribution system of FIG. 1, the first enclosure holding a splice module, a first connector holder, and a second connector holder.
Figure 7:
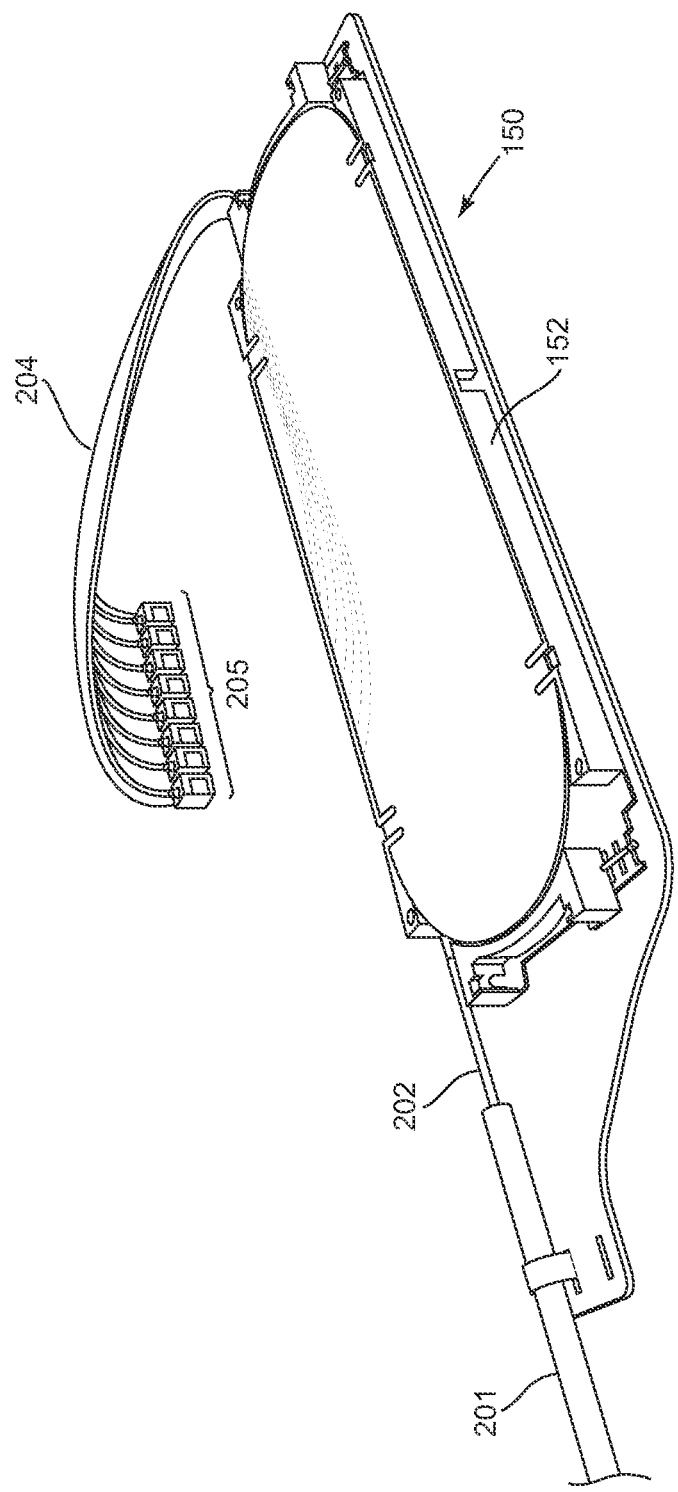
FIG. 7 illustrates one example splice module suitable for use with the first enclosure of FIG. 6.

As shown in FIG. 6, a feed cable 201 can be routed into the interior of the first enclosure housing 141 through a first cable port 142. At the splice module 150, one or more feed fibers 202 of the feed cable 201 are optically coupled to connectorized pigtails 204. One or more connector holders 155 can be disposed within the housing 141 to retain and/or manage the connectorized pigtails 204. One example connector holder 155 suitable for use in the first enclosure 140 is disclosed in U.S. Pat. No. 7,277,620, the disclosure of which is hereby incorporated herein by reference. FIG. 7 illustrates feed fibers 202 of a feed cable 201 routed to a splice tray 152 and optically coupled to pigtails 204, which are terminated by connectors 205. The connectors 205 can be held by the connector holder 155 of FIG. 6.

Figure 8:
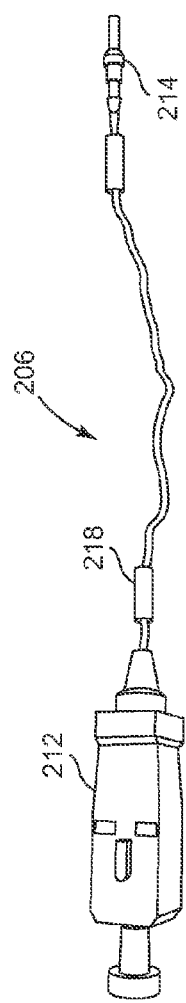
FIG. 8 illustrates an example distribution fiber having a pre-connectorized end and an end terminated by a ferrule without a connector body in accordance with the principles of the present disclosure.

FIG. 6 also shows the bundle 210 of distribution fibers 206 routed into the interior of the first enclosure housing 141 through a second cable port 144. As shown in FIG. 8, each distribution fiber 206 has a first end terminated by a plug-type connector 212 and a second end terminated at a ferrule 214 without a plug-type connector body. In some examples, the distribution fibers 206 can include 900 µm diameter buffered fibers (tight buffered or loose buffered). In other examples, the distribution fibers 206 can include 1.2 mm diameter cables, such as the cables disclosed in U.S. Publication No. 2009-0297104, the disclosure of which is hereby incorporated herein by reference. In still other implementations, other types of fibers or fiber cables can be used. In various examples, the plug-type connector 212 can include an SC-type connector, an LC-type connector, an ST-type connector, an FC-type connector, and LX.5-type connector, etc. It will be appreciated that the ferrules 214 and connectors 212 can be factory installed and ends of the optical fibers can be factory polished.

The distribution fibers 206 of the bundle 210 are organized so that the connectors 212 terminating the first ends of the distribution fibers 206 are disposed adjacent each other. For example, as shown in FIG. 6, the connectors 212 can be organized and managed at a second connector holder 165 within the first enclosure housing 141. In some implementations, the second connector holder 165 is configured to hold one connector 212 for each floor 122, 124, 126, 128 in the building 120. In other implementations, the second connector holder 165 can be configured to hold multiple connectors 212 for one or more floors 122, 124, 126, 128. In the example shown, the first connector holder 155 is configured to hold connectors 205 for eight spliced pigtails 204 and the second connector holder 165 is configured to hold twenty-four connectors 212. In still other implementations, the connectors 212 can be held by multiple connector holders 165.

As shown in FIG. 9, the bundle 210 of distribution fibers 206 includes distribution fibers 206 of varying lengths. In the example shown, one example bundle 210 includes seven optical fibers 206 that are each terminated at a first end by a connector 212 and terminated at a second end by a ferrule 214a-214g. In other implementations, however, the bundle 210 can include a greater or lesser number of optical fibers (e.g., two, eight, twelve, twenty-four, thirty-two, etc.). The optical ferrules 214a-214g are staggered from adjacent ferrules 214a-214g by a stagger distance SD extending along an axial length of the bundle 210.

In some implementations, the stagger distance SD between optical ferrules 214 is longer than a distance FD (FIG. 2) between adjacent floors of the building 120. Accordingly, the optical ferrules 214 are located out of alignment with the fiber distribution terminals 170 when the sheath assembly 220 is initially pulled through the riser 130 (see FIG. 2). For example, in FIG. 2, the optical ferrule 214 terminating the distribution fiber 206 to be stored at the terminal 170 on the first floor 124 is disposed at a first location FH1 above the terminal 170. In certain implementations, the optical ferrule 214 may be initially located above the first floor 124. The optical ferrule 214 terminating the distribution fiber 206 to be stored at the terminal 170 on the second floor 126 is located the stagger distance SD away from the first ferrule 214. In certain implementations, the optical ferrule 214 for the second floor 126 is disposed at a second location FH2 above the terminal 170 on the second floor. In the example shown, the optical ferrule 214 is located above the second floor 126.

In other implementations, the length of each distribution fiber 206 generally corresponds to a distance between the first enclosure 140 and the fiber distribution terminal 170 at one of the floors 122, 124, 126, 128 of the building 120. In some such implementations, the sheath assembly 220 can be positioned to generally align the ferrules 214 with the distribution terminals 170 (e.g., plus an appropriate slack length). In such implementations, each ferrule 214 and slack length can be accessed at the respective floor and stored in the distribution terminal 170 within storing slack length for the rest of the sheath assembly 220.

Figure 11:
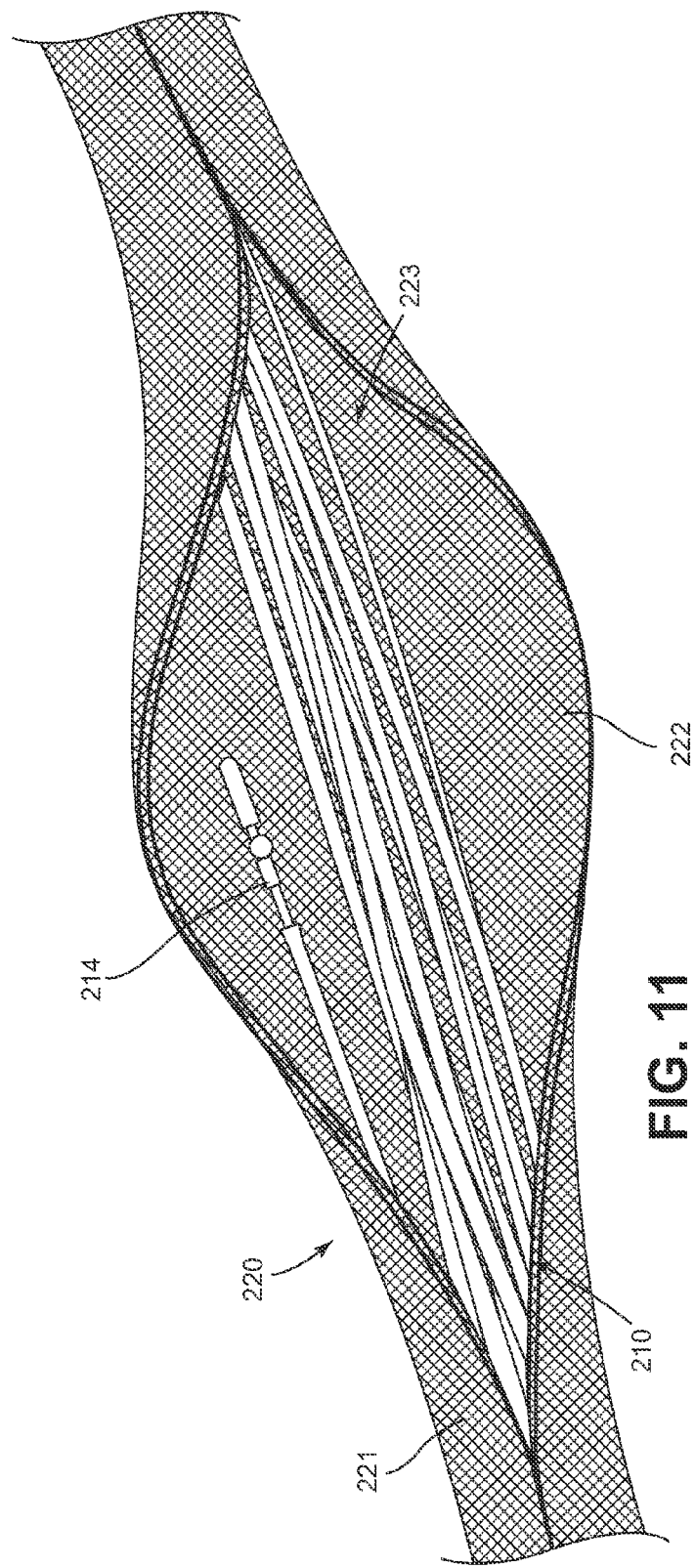
FIG. 11 illustrates an example sheath body enclosing the bundled distribution fibers, which are shown to be accessible through an axial slit in the mesh body.

FIGS. 10 and 11 illustrate one example sheath assembly 220 that can enclose at least the second ends of the distribution fibers 206 to route the distribution fibers 206 to the distribution terminals 170. FIG. 11 illustrates one example sheath assembly 220 including a sheath body 221 that wraps around and bundles the distribution fiber bundle 210. In some implementations, the sheath body 221 extends along at least half of the length of the distribution fibers 206. In certain implementations, the sheath body 221 extends along a majority of the length of the distribution fibers 206. In example implementations, the sheath body 221 extends substantially along the length of the distribution fibers 206. In other example implementations, the sheath body 221 extends fully along the length of the distribution fibers 206.

In some implementations, axial edges 222 of the sheath body 221 overlap to enclosure the bundle 210 within the body 221. The axial edges 222 can be spread open to reveal an axial slit 222 along the length of the body 221. In other implementations, portions of the body 221 can be removed or cut at appropriate locations to form axial slits that correspond to the distribution terminals 170. In certain examples, the fiber bundle 210 is bundled only by the sheath body 221. In other examples, additional bundling elements (e.g., strands of yarn helically wound about the bundle, alignment slips or holders, etc.) can be used.

The sheath body 221 can include any type of casing, covering, jacketing, or other structure suitable for covering the optical fibers. For example, in certain implementations, the sheath body 221 is formed from a woven mesh 223. Strands or fibers forming the mesh 223 define holes, gaps, or other spaces therebetween that enable the compression of the mesh 223. The spaces defined by the mesh 223 reduce the surface area of the sheath body 221, thereby reducing the friction created when pulling the sheath body 221 along a conduit (e.g., riser 130). Certain types of sheath bodies 221 (e.g., fibers of the mesh 223) are formed from a flame retardant material. In certain implementations, the optical fibers 206 do not bond to the sheath body 221. Rather, the optical fibers 206 are free to move (e.g., axially, laterally, and/or rotationally) within to the sheath body 221. In certain implementations, the sheath body 221 does not kink when folded, twisted, crushed, or otherwise compressed along its longitudinal axis. Rather, in some implementations, the compressed side of the sheath 221 collapses on itself.

The sheath body 221 inhibits damage to the distribution fibers 206 while the distribution fibers 206 are routed through the building riser 130. In the example shown, the body 221 does not stretch along an axial direction of the sheath assembly 220. For example, the body 221 can include one or more axially extending strength members coupled to or woven into the mesh 223 or other material forming the sheath body 221. The sheath 221 stretches laterally (i.e., between the axial edges) to enable a user to open the axial slit 222 to access the distribution fibers 206 (see FIG. 11). Because the sheath 221 does not stretch axially, the pulling point 225 for the sheath assembly 220 is provided on the sheath body 221 (e.g., at a pulling loop formed by at one end of the sheath 221) to enable the sheath assembly 220 to be pulled up the building riser 130 without pulling or otherwise exerting strain on the distribution fibers 206.

In some implementations, markings (e.g., paint) or other indications 228 can be provided on the sheath body 221 to mark locations at which the ferrules 214 can be accessed through the axial slit(s) 222 to facilitate installation. In certain implementations, each ferrule location is marked with a number or other indicium 228 that uniquely identifies the corresponding ferrule 214 from the other ferrules 214. In certain implementations, the indicium 228 is marked on the optical fibers 206, themselves. In certain implementations, the unique number or other indicium 228 also is printed or otherwise marked on the sheath body 221 at the first ends of the respective fibers 206 for ease in tracking connections throughout the building and identifying which connectors 212 are coupled to which distribution terminals 170. In certain implementations, the unique number or other indicium 228 are printed on the optical fibers 206 at or near the ends terminated by the connectors 212 or on the connectors 212. In some implementations, each distribution fiber 206 has a jacket that is color-coded based on the length of the fiber 206. In other implementations, however, the distribution fibers 206 are the same color.

Figure 3:
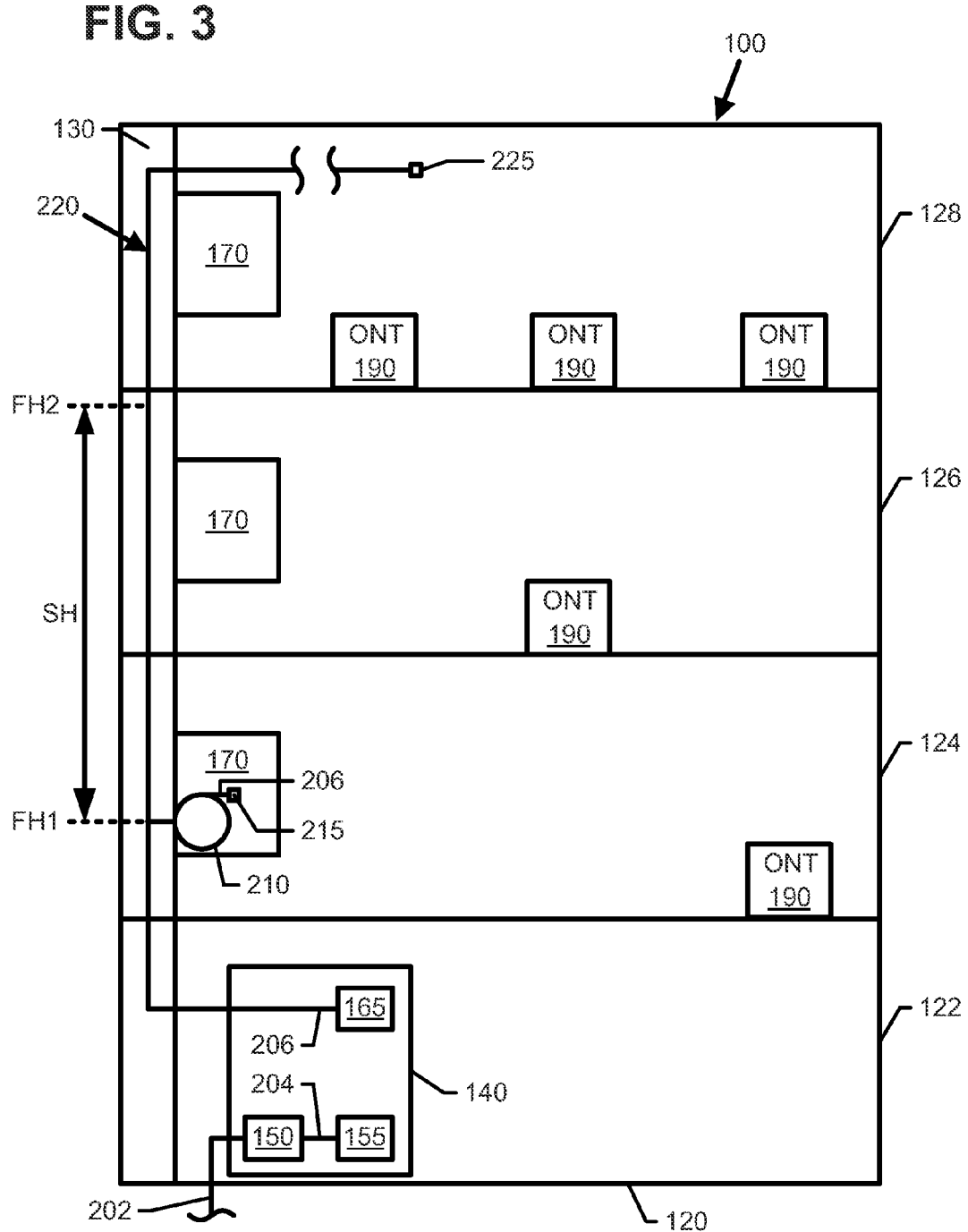
Figure 4:
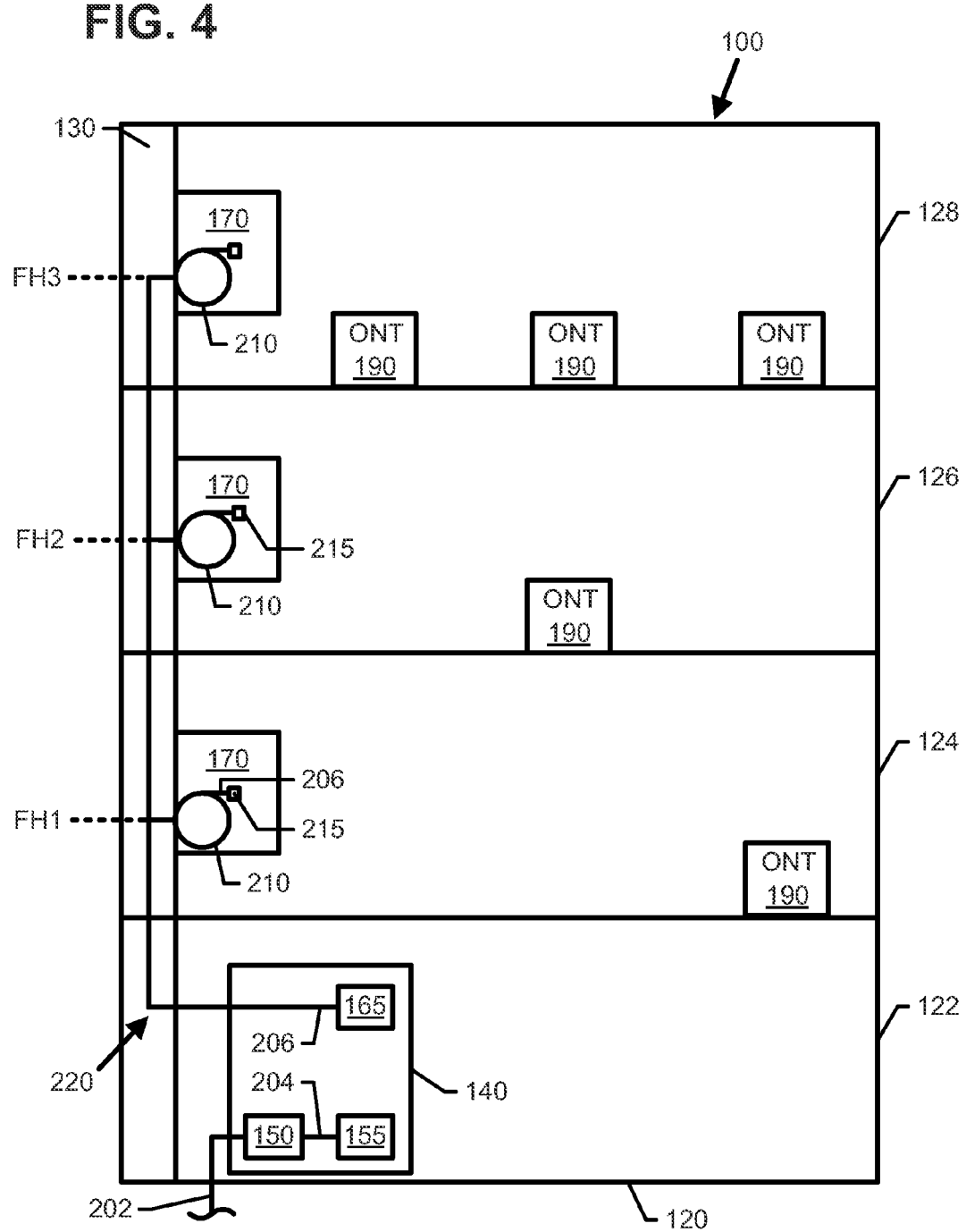
Figure 12:
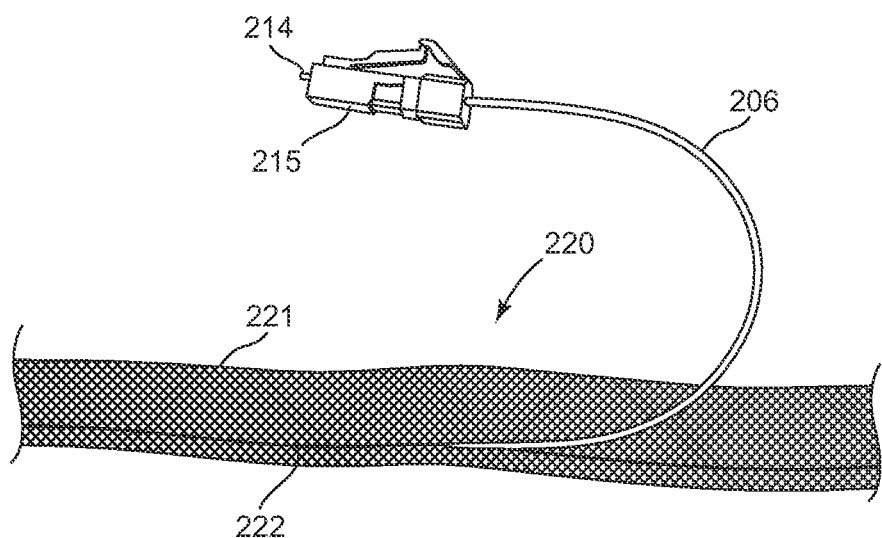
FIG. 12 illustrates one of the distribution fibers after the fiber has been removed from the sheath body and a connector body has been installed over the optical ferrule.

As shown in FIGS. 3, 4, and 12, the sheath assembly 220 can be accessed at each floor 124, 126, 128 to pull out an appropriate length of one or more of the distribution fibers 206. As shown in FIG. 12, a plug-type connector body 215 can be installed over the ferrule 214 when the distribution fiber 206 is removed from the sheath assembly 220 or otherwise accessed. In the example shown in FIG. 12, the connector body 215 forms an LC-type connector. In other implementations, however, the connector body 215 can form any desired type of plug-type optical connector. One example of a suitable connector body 215 for installing over the distribution fiber ferrule 214 can be found in co-pending U.S. Application No. 61/731,838, filed herewith, and titled Fiber Optic Connector with Field Installable Outer Connector Housing, the disclosure of which is hereby incorporated herein by reference.

Figure 13:
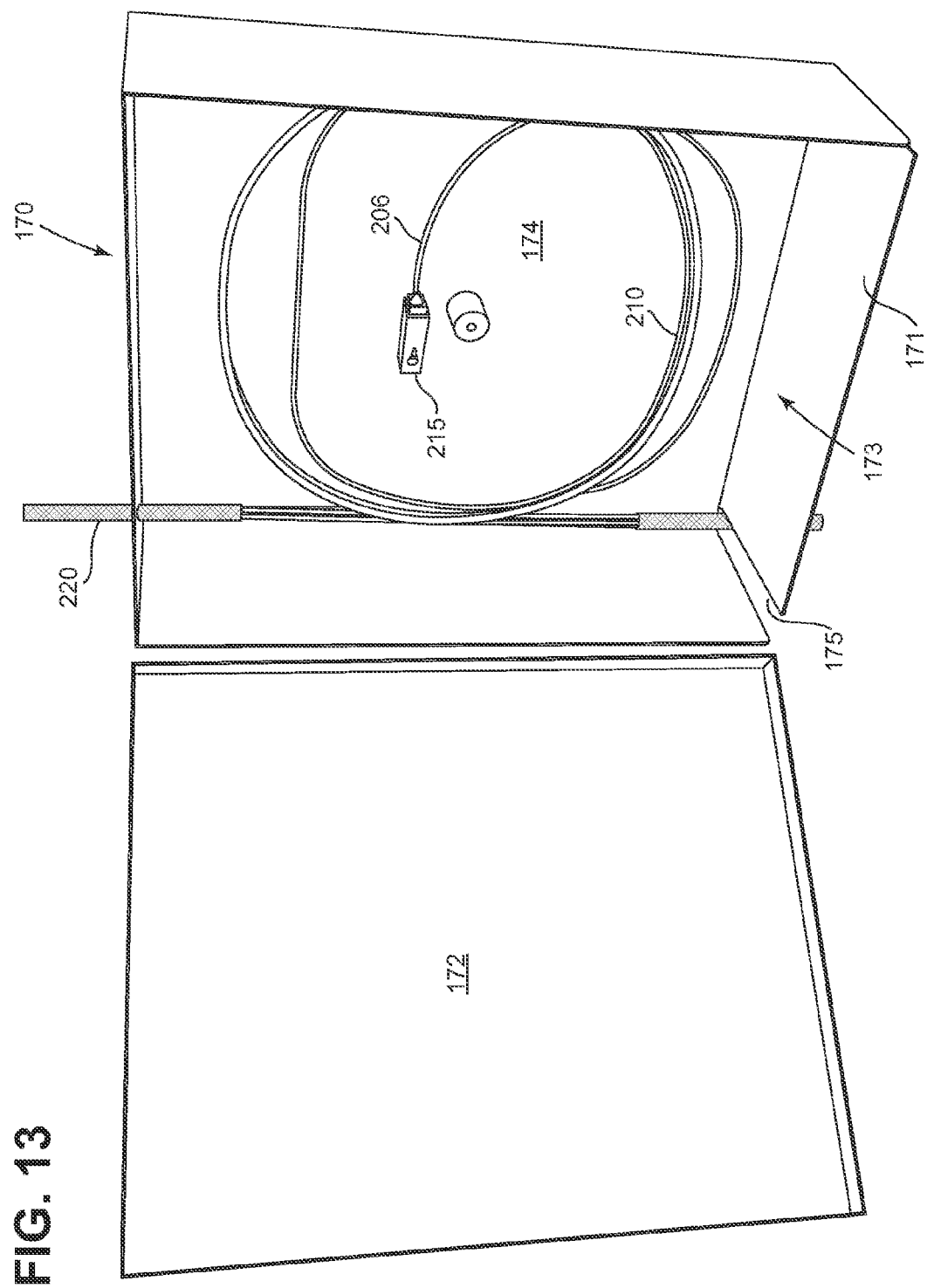
FIG. 13 illustrates a fiber distribution terminal holding a loop of the distribution fiber bundle including the distribution fiber of FIG. 12 mounted to a rear wall of the terminal.
Figure 14:
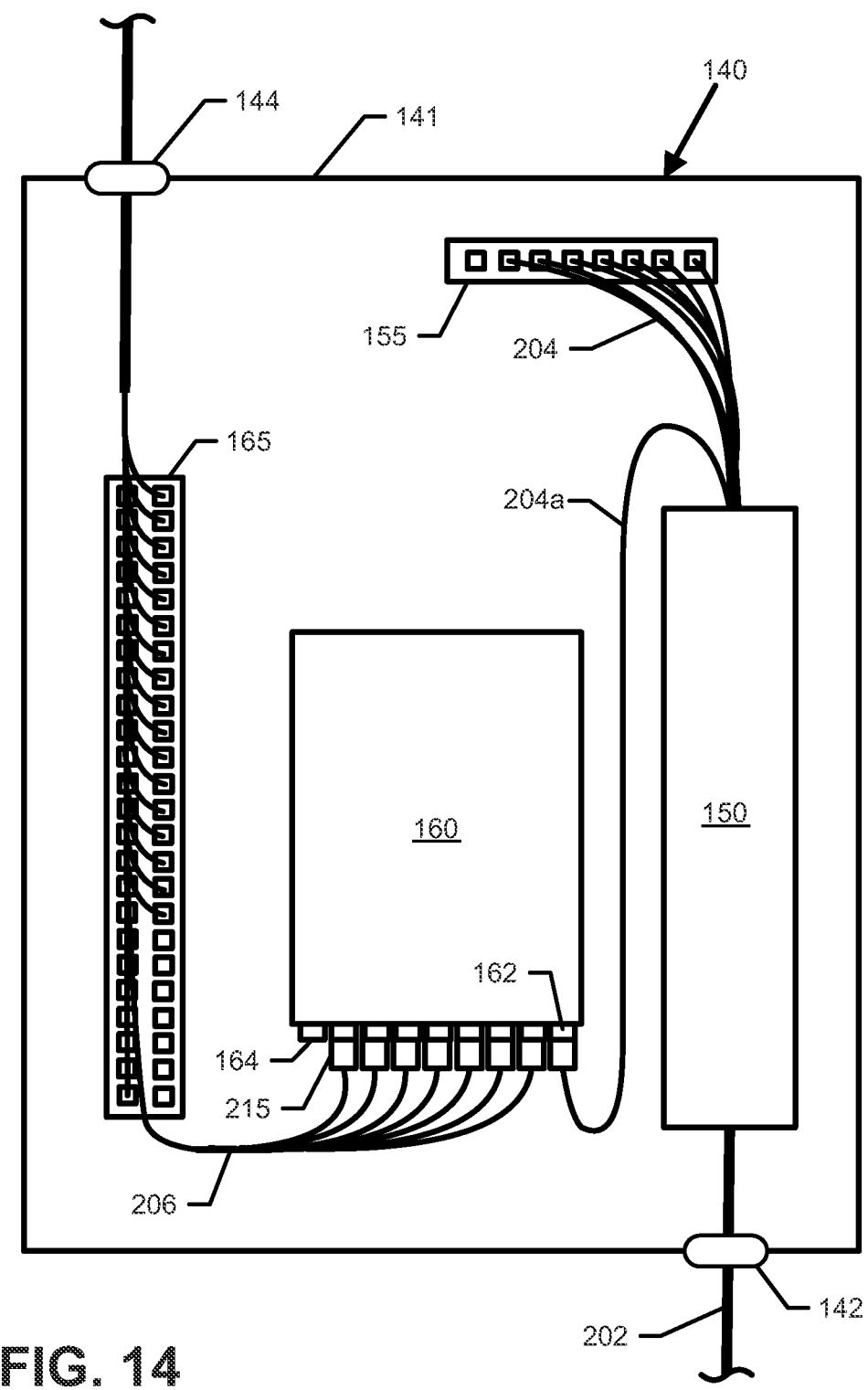
FIG. 14 is a schematic diagram of the first enclosure of FIG. 6 with a splitter installed and at least partially cabled therein.

As shown in FIGS. 3, 4, and 13, the connector body 215 and slack length of the accessed fiber 206 can be stored within the fiber distribution terminal 170 at each floor 124, 126, 128. In some implementations, the distribution fibers 206 are accessed by pulling the sheath assembly 220 back towards the distribution terminal 170 on the respective floor 124, 126, 128 to form a loop of the sheath assembly 220 (or a loop of the fiber bundle 210 contained therein). The loop can be stored within the fiber distribution terminal 170 at each floor (see FIG. 13). In certain implementations, a user accesses the optical ferrule 214 at a marked location 228 (FIG. 10) on the sheath assembly 220 and pulls the ferrule 214 out of the sheath body 221 through the axial slit 222. In certain implementations, a portion of the sheath assembly 220 is removed (e.g., cut) from the bundle 210 so that the ferrule 214 is visible in the bundle 210 (see FIG. 13). In some examples, an axial length of the sheath body 221 corresponding to the loop of excess fiber can be removed.

As shown in FIG. 13, one example terminal 170 can include a base 171 and a pivoting cover 172 that selectively covers and provides access to an interior 173 of the base 171. In the example shown, the sheath assembly 220 passes the terminal 170 via cable ports 175 (e.g., apertures, slots, etc.) defined in the base 171. In some implementations, only the distribution fiber 206 to be stored in the terminal 170 is pulled out of the sheath assembly 220 within the base 171. In other implementations, a portion of the sheath assembly 220 (e.g., an axial length) is removed to reveal the bundle 210 of fibers 206 to facilitate access to the distribution fiber 206 to be stored.

In some implementations, the rear wall 174 of the base 171 is configured to hold the slack length or fiber bundle 210 in a looped configuration. For example, the rear wall 174 may include one or more spools, radius limiters, or other management structures to hold the slack length or bundle 210. In other implementations, the slack length or bundle 210 can be stored elsewhere in the terminal 170. In certain implementations, a cover plate 176 (FIG. 15) can be installed within the base 171 between the rear wall 174 and an open front of the base 171. In some such implementations, the cover plate 176 blocks access to the sheath assembly 220 passing through the terminal 170. In certain implementations, the cover plate 176 blocks access to the looped portion of the bundle 210 or slack length of the fiber 206. In some such implementations, the connectorized end of the distribution fiber 206 is routed through a slot 177 defined in the cover plate 176 and stored at a front side of the cover plate 176.

Referring to FIG. 4, the fiber distribution system 100 can be installed within the building 120 without immediately connecting subscribers to the feed fiber 202. In the example shown, no splitters 160, 180 are installed initially at the first enclosure 140 or any of the distribution terminals 170. Installing the fiber distribution system 100 without any of the splitters 160, 180 reduces the cost of the initial installation. The first enclosure 140 in the basement 122 includes connectorized ends of the feed fibers 202 or pigtails 204 coupled thereto stored in the connector holder 155. First connectorized ends 212 of the distribution fibers also are stored in the connector holder 165 within the first enclosure 140. However, the distribution fibers 206 are not yet optically coupled to the feed fibers 202 since no splitters 160 have been installed. Second connectorized ends 214 of the distribution fibers 206 are stored at the distribution terminals 170. However, the distribution fibers 206 are not yet optically coupled to the patch cords 208 (e.g., since no splitters 180 have been installed). In the example shown, patch cords 208 have not yet been routed between the distribution terminals 170 and any of the ONT's 190. In other implementations, however, first connectorized ends of the patch cords 208 can be stored at the distribution terminals 170 and second connectorized ends of the patch cords 208 can be routed to the ONT's 190 at each floor 124, 126, 128 before the respective splitters 180 are installed. In still other implementations, the building 120 or floors 124, 126, 128 thereof may not even include any ONT's yet. In still other implementations, one or more splitters 160, 180 can be installed during installation if service to one or more subscribers is desired at the time of installation.

Referring to FIGS. 5 and 14-17, subscriber capacity can be incrementally added to the distribution system 100 by adding splitter modules 160, 180 at appropriate locations within the distribution system 100. For example, a splitter 160 can be added to the first enclosure 140 to optically couple at least one feed fiber 202 to at least one distribution fiber 206. A splitter 180 also can be added to one of the distribution terminals 170 to optically couple the respective distribution fiber 206 to one or more patch cords 208 as needed. In some implementations, a patch cord 208 can be routed to an appropriate ONT 190. In other implementations, a connectorized end of a precabled patch cord 208 can be connected to the splitter 180 within the terminal 170.

Figure 5:
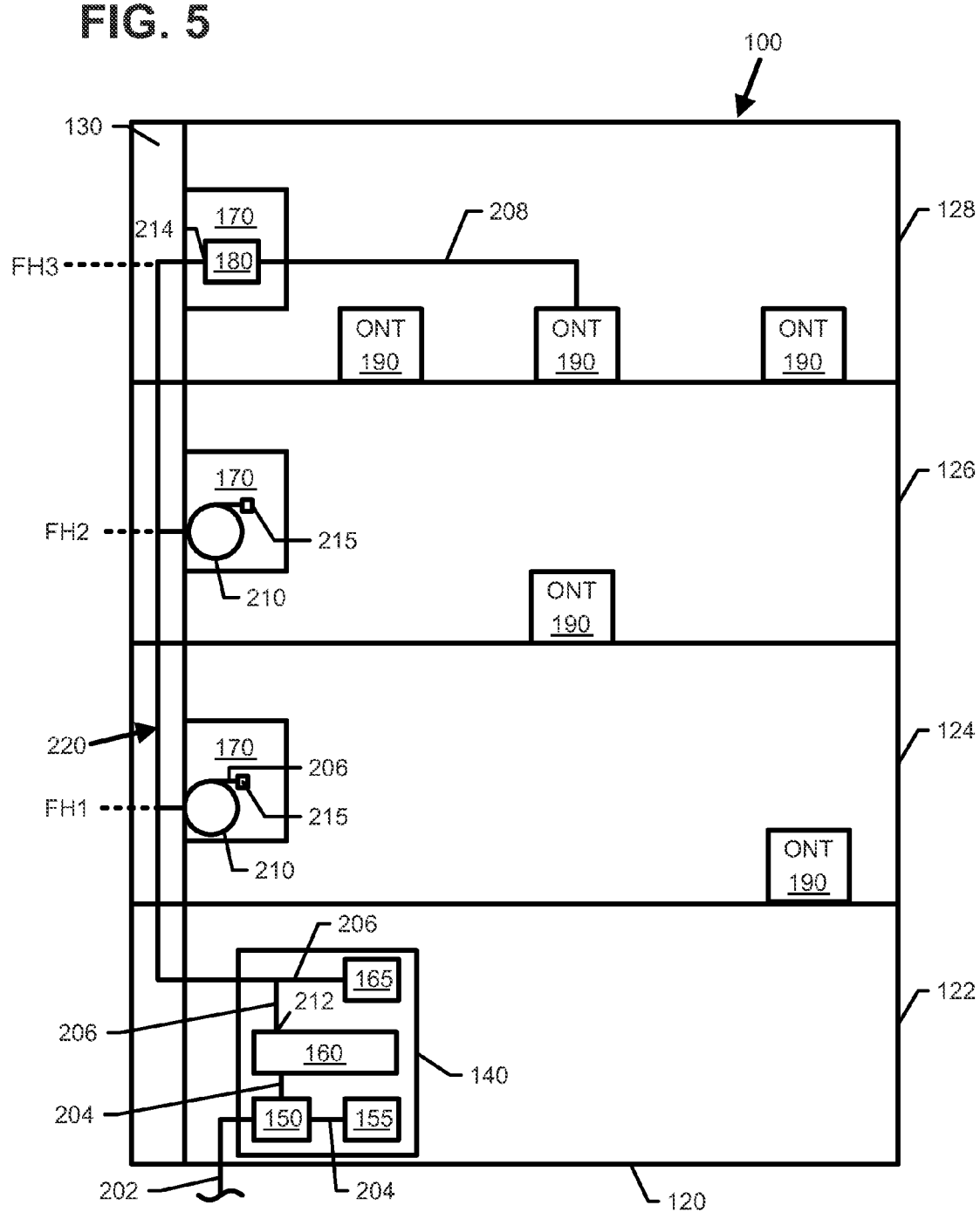

FIG. 5 illustrates a subscriber being coupled to the network via the fiber distribution system 100. At least one splitter 160 is mounted within the first enclosure 140. In the example shown, one of the spliced pigtails 204 is routed to a splitter input port and one of the plug-type connectors 212 is routed to a splitter output port for connection to the spliced pigtail 204. In the example shown in FIG. 14, one of the spliced pigtails 204a is moved from the connector holder 155 to an input port 162 of a splitter 160. One or more of the distribution fibers 206 are moved from the connector holder 165 to output ports 164 of the splitter 160. Other pigtails 204 and other distribution fiber connectors 212 remain in the respective connector holders 155, 165 until needed for service.

Figure 15:
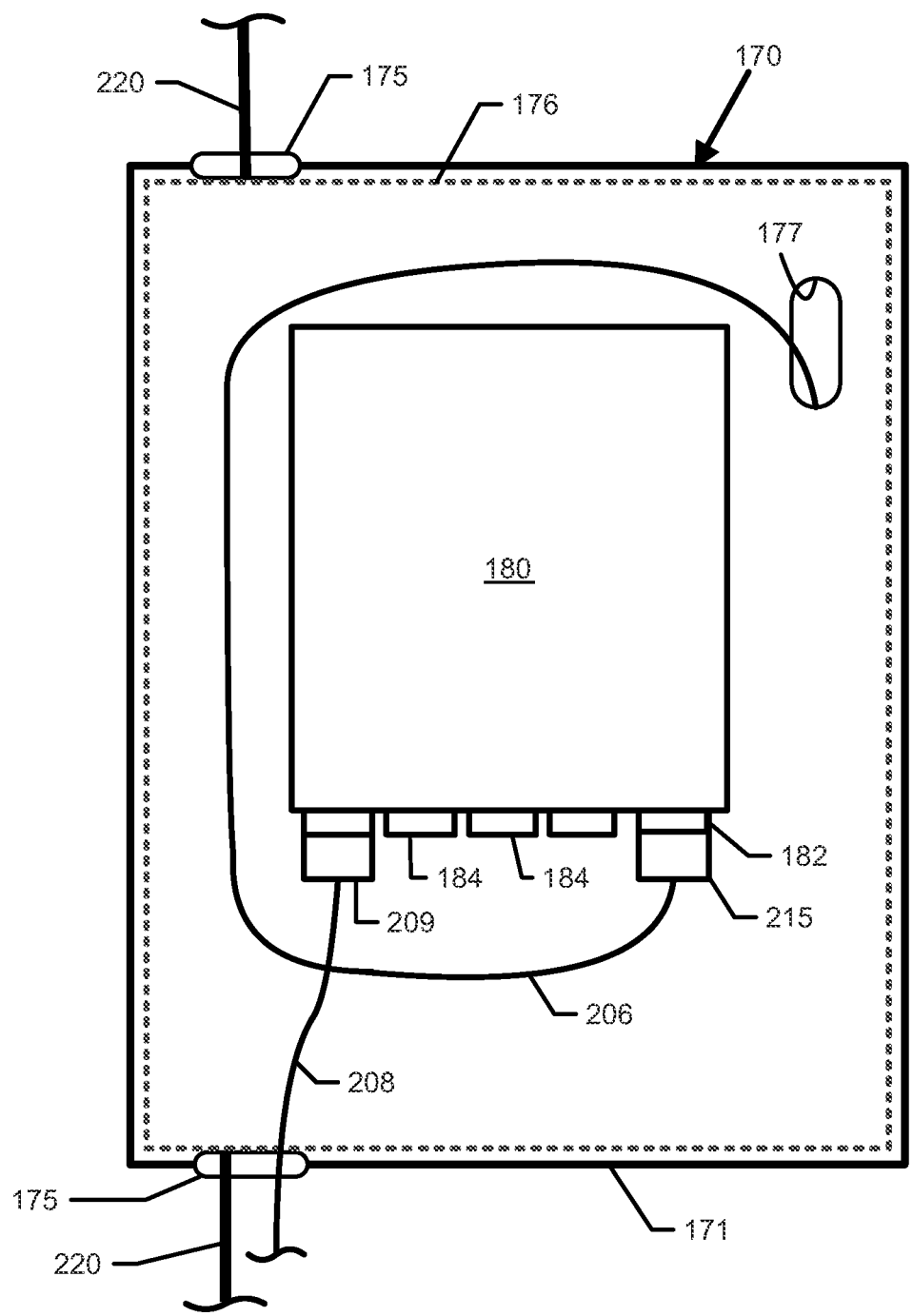
FIG. 15 is a schematic diagram of the fiber distribution terminal of FIG. 13 with a splitter installed and at least partially cabled at a cover plate within the terminal.

As shown in FIG. 5, splitters 180 are not installed in distribution terminals 170 when service is not requested on the respective floor 124, 126, 128. A splitter 180 is installed in the distribution terminal 170 at the floor 128 on which service is requested. As shown in FIG. 15, the connectorized end 215 of the respective distribution fiber 206 is coupled to an input port 182 of the splitter 180 (e.g., plugged into an input adapter). A connectorized end of a patch cord 208 also is coupled to an output port 184 of the splitter 180. As additional service requests are made on the floor 128, additional patch cords 208 can be routed between the respective ONT's 190 and appropriate output ports on the splitter 180.

Figure 16:
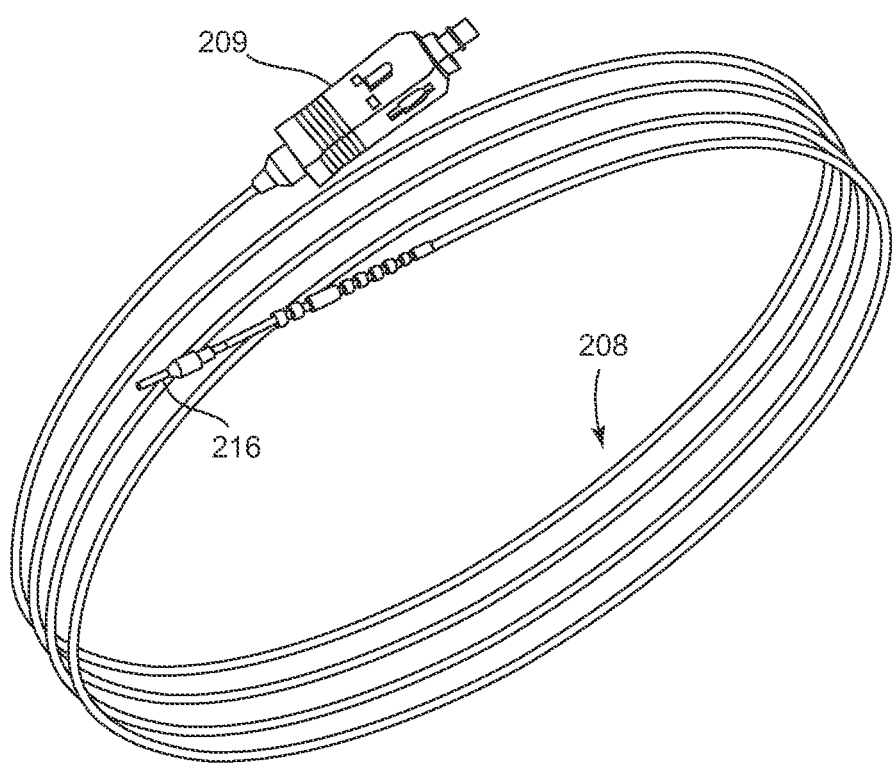
FIG. 16 illustrates one example implementation of a patch cord for use in connecting a distribution fiber to an ONT, the patch cord having a first end terminated by an optical connector and a second end terminated by an optical ferrule without an optical connector.

FIG. 16 illustrates one example patch cord 208 suitable for use in connecting an ONT 190 to a distribution fiber 206 at one of the distribution terminals 170. The patch cord 208 includes a fiber that extends from a first end terminated by an optical connector 209 to a second end terminated at a ferrule 216. In certain implementations, the patch cord 208 includes a 1.2 mm cable. In other implementations, however, other types of fibers or cables can be utilized. In various examples, the optical connector 209 can include an SC-type connector, an LC-type connector, an ST-type connector, an FC-type connector, and LX.5-type connector, etc.

By having the second end of the patch cord 208 terminated only by a ferrule 216, the second end of the patch cord 208 can be moved more easily through the wall, ceiling, ducts, raceways, or other routing structures from the terminal 170 to the ONT 190. When the second end of the patch cord 208 reaches the ONT 190, a remainder of a connector body (e.g., an SC-type connector body, and LC-type connector body, etc.) can be installed over the ferrule 216. The connector body can be plugged into the ONT 190 to provide service to the respective subscriber. In other examples, the patch cord can be routed in the reverse direction such that the ferrule end of the patch cord is routed from the ONT to the terminal 170.

Figure 17:
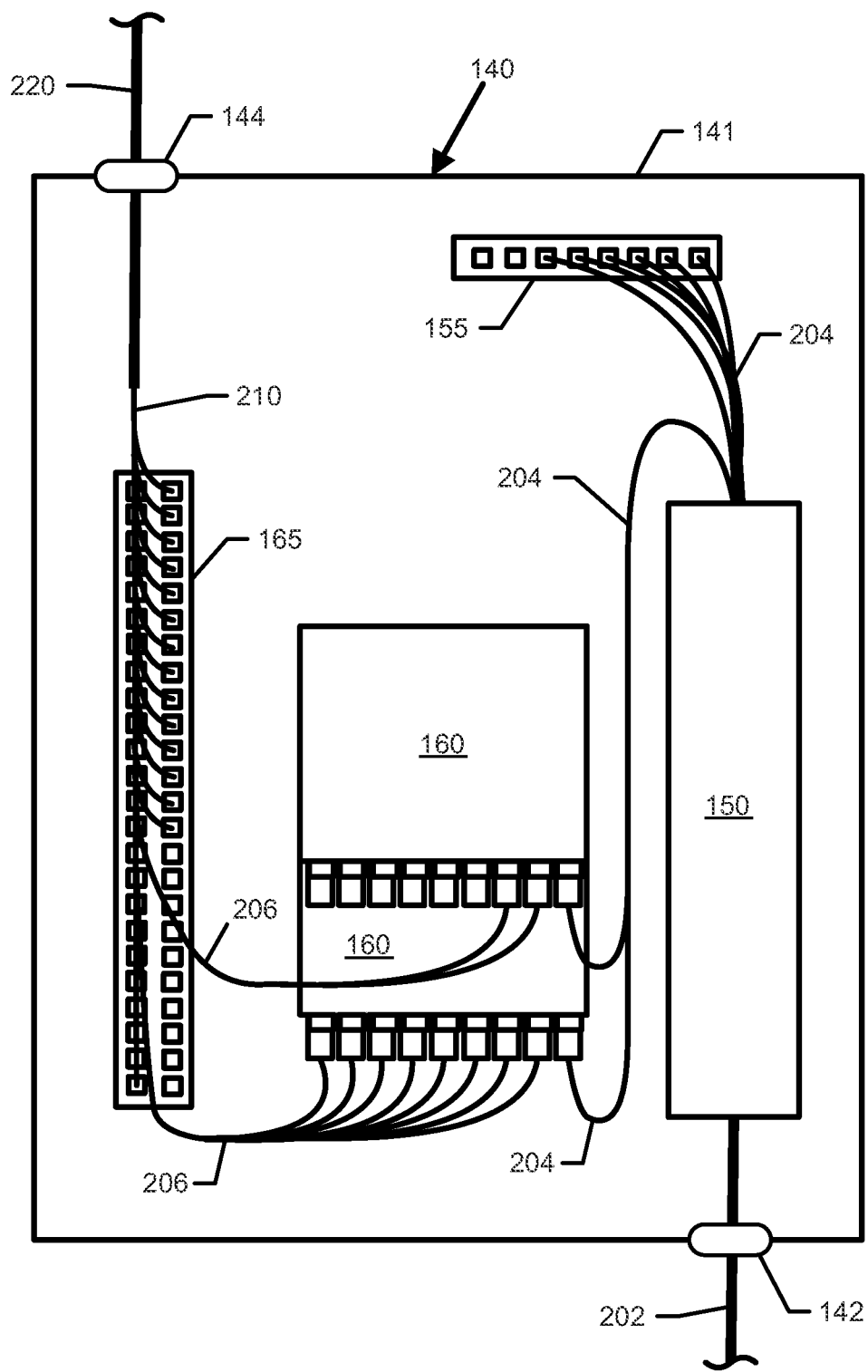
FIG. 17 is a schematic diagram of the example first enclosure of FIG. 14 with a second splitter installed and cabled therein.

As shown in FIG. 17, a single splitter 160 installed at the first enclosure 140 may have insufficient capacity to provide service to all floors 124, 126, 128 of the building 120. In such implementations, additional splitters 160 can be added to the first enclosure 140 to accommodate additional floors. In some implementations, a single splitter 180 installed at one of the distribution terminals 170 may have sufficient capacity to provide service to all ONT's 190 on the respective floor. In other implementations, however, additional splitters 180 may be installed at the terminal 170 to accommodate any additional ONT's 190 on the floor.

Figure 18:
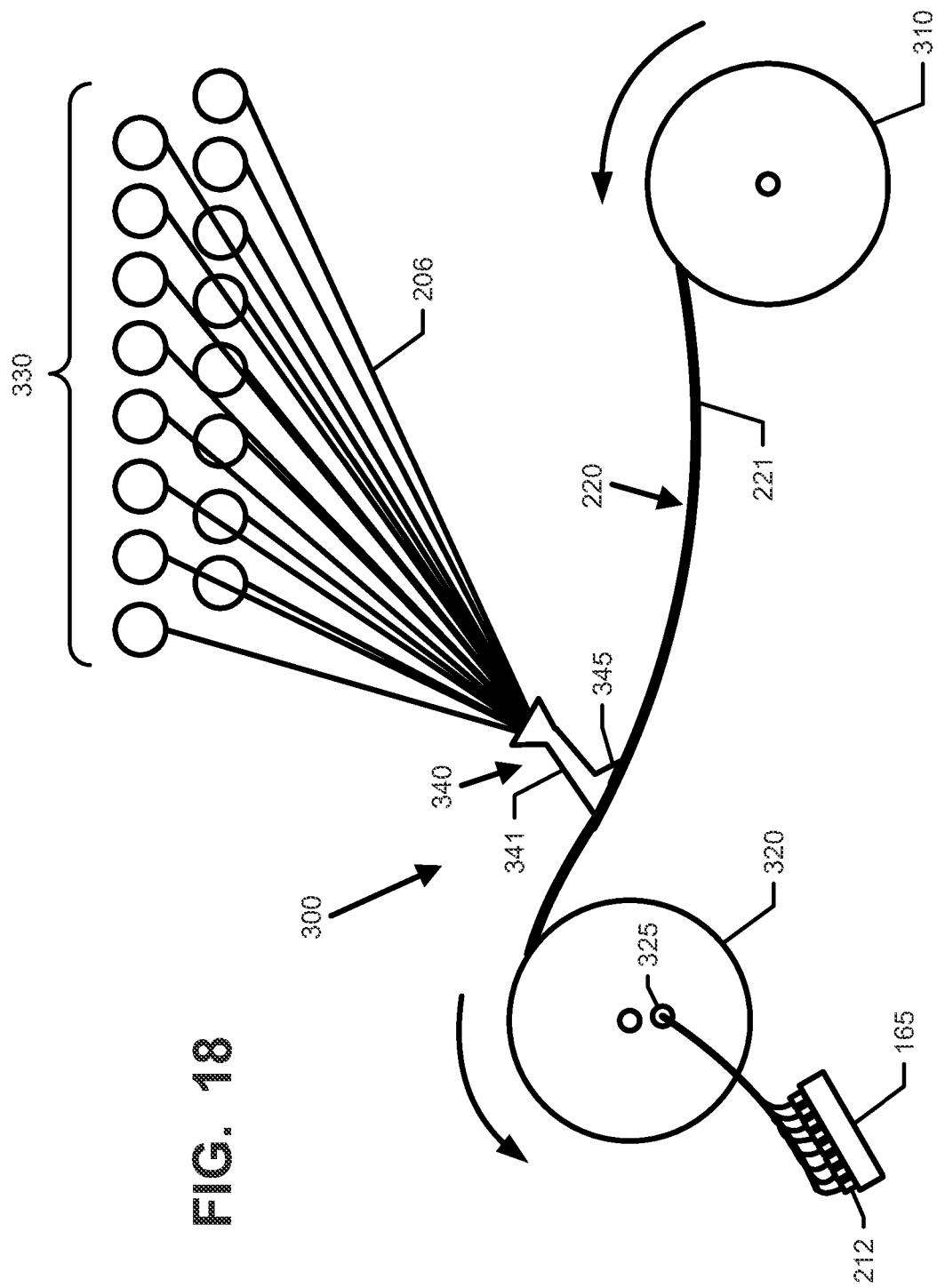
FIG. 18 illustrates an example sheath assembly system with which distribution fibers can be bundled and disposed within a sheath in preparation for installation within a building.
Figure 19:
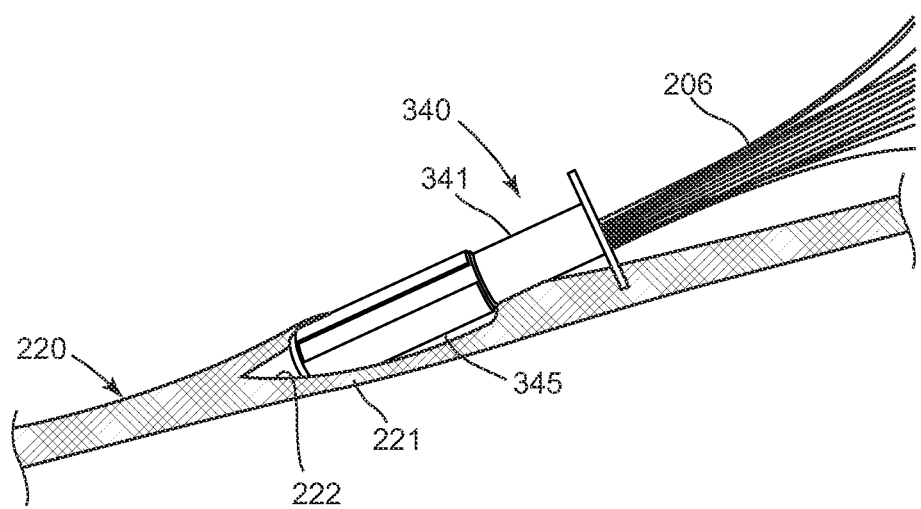
FIG. 19 illustrates an insertion tool facilitating insertion of distribution fibers within a sheath body in accordance with the principles of the present disclosure.

Referring now to FIGS. 18 and 19, one example sheath assembly system 300 with which the distribution fibers 206 can be bundled and disposed within the sheath assembly 220 in preparation for installation within the building 120 is shown. In some implementations, two or more distribution fibers 206 are bundled within the sheath assembly 220. In certain implementations, more than four distribution fibers 206 are bundled into the sheath assembly 220. In certain implementations, more than eight distribution fibers 206 are bundled into the sheath assembly 220. In certain implementations, more than twelve distribution fibers 206 are bundled into the sheath assembly 220. In one example, thirty-two fibers 206 are bundled into the sheath assembly 220. In another example, twenty-four distribution fibers 206 are bundled into the sheath assembly 220. In another example, thirty-six distribution fibers 206 are bundled into the sheath assembly 220.

The sheath assembly system 300 includes a first spool 310 that holds an empty length of the sheath body 221. Distribution fibers 206 of predetermined lengths are inventoried on bobbins 330. Each distribution fiber 206 is pre-connectorized at one end with a plug-type optical fiber connector 212. The other end of the distribution fiber 206 is pre-ferrulized (i.e., terminated by an optical ferrule 214 without a connector body). Bobbins 330 holding the appropriate lengths for the building into which the sheath assembly 220 is to be installed are selected for insertion into the sheath assembly 220. A second spool 320 also is provided for winding and storing the assembled sheath assembly 220. For example, ends of the sheath body 221 and distribution fibers 206 can be pulled by the second spool 320 from the first spool 310 and bobbins 330.

An insertion tool 340 facilitates placement of the distribution fibers 206 within the sheath body 221. In some implementations, the insertion tool 340 includes a body 341 that defines a passage or channel through which the distribution fibers 206 pass. For example, the insertion body 341 may be tubular in shape (see FIG. 19). The insertion tool 340 also can include a plow section 345 that facilitates spreading of the axial slit 222 of the sheath body 221. To route the distribution fibers 206 into the sheath body 221, the fibers 206 are routed through the tool body 341 and the plow section 345 of the tool 340 is inserted into the sheath body 221 so that the plow section 345 separates the axial edges of the sheath body 221. The sheath body 221 is moved axially relative to the plow section 345 as the sheath body 221 is wound onto the spool 320 while the plow section 345 remains stationary. During the axial movement, the plow section 345 spreads open the slit 222 and the body 341 directs the fibers 206 into the spread open slit 222 (see FIG. 19). The fibers are pulled into the sheath body 221 as the sheath body 221 is wrapped on the take-up spool 320.

The distribution fibers 206 each have a connectorized end 212 that can be stored at a connector holder 165. For example, the connectorized end 212 can be routed through an aperture 325 at a side flange of the second spool 320 and plugged into the connector holder 165. In other implementations, the aperture 325 is sized to enable the connector holder 165 to pass through the aperture 325 while the plug-type connectors 212 are held by the connector holder 165. The second spool 320 pulls the sheath body 221 and distribution fibers 206 until all of the bobbins 330 are empty and all of the distribution fibers 206 are contained within the sheath body 221. The filled sheath body 221 is cut from the first spool 310 and a pulling loop or other pulling structure is formed at the cut end. The second spool 320 is transported to the building 120 for installation.

Various modifications and alterations of this disclosure will become apparent to those skilled in the art without departing from the scope and spirit of this disclosure, and it should be understood that the scope of this disclosure is not to be unduly limited to the illustrative examples set forth herein.

For example, in certain implementations, the sheath assembly 220 may hold ferrule-less ends of the distribution fibers 206 during the initial installation. In some such implementations, plug-type fiber optic connectors 215 can be mounted to the ferrule-less ends of the distribution fibers 206 when the distribution fibers 206 are disposed in the distribution terminals 170. In certain implementations, the plug-type fiber optic connectors 215 do not include or hold optical ferrules. Rather, plug-type connector bodies can be installed over the ferrule-less ends of the optical fibers 206. In other implementations, the ferrule-less ends can be ferrulized in the field and plug-type connectors 215 can be mounted to the then ferrulized end.

In still other implementations, the ferrule-less ends of the distribution fibers 206 can be optically spliced (e.g., fusion spliced, mechanically spliced, etc.) to first ends of stub or pigtail optical fibers that have connectorized second ends. As the terms are used herein, a "stub" optical fiber refers to a fiber that is sufficiently short that the optical splice is disposed within the optical connector forming the connectorized second end; and a "pigtail" optical fiber refers to a fiber that is sufficiently long that the optical splice is disposed outside of the optical connector forming the connectorized second end. The connectorized second ends include plug-type connectors. Certain types of plug-type connectors include optical ferrules. Examples of a suitable stub optical fiber are disclosed in U.S. Pat. No. 6,811,323, the disclosure of which is hereby incorporated herein by reference.

In use, a sheath assembly 220 enclosing ferrule-less ends of distribution fibers 206 can be routed through a routing pathway in the field (e.g., through one or more risers 130 at an MDU 120) as described above. At one or more locations along the routing pathway, the ferrule-less ends of the distribution fibers 206 are accessed through the axial slit 222 in the body 221 of the sheath assembly 220. The ferrule-less ends of the accessed distribution fibers 206 are connectorized at the locations with plug-type connectors 215. For example, in some implementations, the ferrule-less ends are fusion spliced to connectorized stub fibers or pigtail fibers. In other implementations, the ferrule-less ends are mechanically spliced to connectorized stub fibers or pigtail fibers. In other implementations, the plug-type connectors 215 are mounted over the ferrule-less ends of the fibers 206. In still other implementations, the ferrule-less ends may be ferrulized in the field; and the plug-type optical connectors 215 may be mounted over the now ferrulized ends.

What is claimed is:

1. A method of installing a fiber distribution system in a building having multiple floors, the method comprising:
   routing a feed fiber to a first enclosure located at one of the floors of the building;
   disposing pre-connectorized ends of distribution fibers within the first enclosure;
   routing optical ferrules, which terminate second ends of the distribution fibers without connector bodies, through the building via a sheath assembly;
   accessing the optical ferrules of the distribution fibers at respective floors;
   attaching connector bodies around the optical ferrules; and
   disposing the connector bodies within fiber distribution terminals at the floors.

2. The method of installing the fiber distribution system of claim 1, wherein accessing the optical ferrules of the distribution fibers at the respective floors comprises:
   pulling back the sheath assembly;
   looping at least part of the sheath assembly within the fiber distribution terminals; and
   removing each optical ferrule and a slack length of the respective distribution fiber from the sheath assembly at each floor.

3. The method of installing the fiber distribution system of claim 1, further comprising mounting a first connector holder within the first enclosure, the first connector holder storing a connectorized end of the feed fiber or a connectorized end of a pigtail fiber that is spliced to the feed fiber.

4. The method of installing the fiber distribution system of claim 3, further comprising mounting a second connector holder within the first enclosure, the second connector holder storing the pre-connectorized ends of the distribution fibers.

5. The method of installing the fiber distribution system of claim 1, further comprising incrementally connecting subscribers to the fiber distribution system.

6. The method of installing the fiber distribution system of claim 5, wherein incrementally connecting subscribers further comprises:
   mounting a first splitter within the first enclosure;
   optically coupling the feed fiber to the first splitter;
   optically coupling the pre-connectorized end of a first of the distribution fibers to the first splitter;
   mounting a second splitter within the fiber distribution terminal at one of the floors;
   optically coupling the connector body of the first distribution fiber to the second splitter;
   optically coupling a first end of a patch cord to the second splitter; and
   optically coupling a second end of the patch cord to an ONT located on the same floor as the fiber distribution terminal.

7. The method of installing the fiber distribution system of claim 6, wherein optically coupling the second end of the patch cord to the ONT comprises:
   routing the second end of the patch cord from the fiber distribution terminal to the ONT, the second end being terminated by an optical ferrule without a connector body;
   attaching a second connector body around the optical ferrule at the second end of the patch cord; and
   plugging the second connector body into the ONT.

8. The method of installing the fiber distribution system of claim 6, wherein optically coupling the first end of a patch cord to the second splitter comprises inserting an optical connector terminating the first end of the patch cord into an output port of the second splitter.

9. The method of installing the fiber distribution system of claim 6, further comprising:
   mounting another splitter within the first enclosure;
   optically coupling another feed fiber to the another splitter;
   optically coupling the pre-connectorized end of at least another of the distribution fibers to the another splitter.

10. The method of claim 1, wherein accessing the optical ferrules of the distribution fibers at the respective floors comprises accessing the optical ferrules from the sheath assembly via an axial slit defined in the sheath assembly.

11. The method of claim 1, wherein the sheath assembly includes a sheath body that wraps around and bundles the pre-connectorized ends of the distribution fibers.

12. The method of claim 11, wherein the sheath body has axial edges that overlap to enclose the pre-connectorized ends of the distribution fibers.

13. The method of claim 11, further comprising helically winding strands of yarn around the pre-connectorized ends of the distribution fibers.

14. The method of claim 1, wherein the sheath assembly extends along a majority of a length of the distribution fibers.

* * * * *